US008191372B2

(12) United States Patent
Aggarwal

(10) Patent No.: US 8,191,372 B2
(45) Date of Patent: Jun. 5, 2012

(54) SYSTEM AND METHOD TO GENERATE ENVIRONMENT-FRIENDLY POWER BY TAPPING ATMOSPHERIC COLD

(76) Inventor: Abhinav Aggarwal, Chapel Hill, NC (US)

( * ) Notice: Subject to any disclaimer, the term of this patent is extended or adjusted under 35 U.S.C. 154(b) by 1407 days.

(21) Appl. No.: 11/308,205

(22) Filed: Mar. 11, 2006

(65) Prior Publication Data

US 2007/0209358 A1    Sep. 13, 2007

(51) Int. Cl.
*F01K 27/00* (2006.01)
*F01B 29/00* (2006.01)

(52) U.S. Cl. .............................. 60/641.1; 60/508; 60/513

(58) Field of Classification Search .... 60/641.1–641.15, 60/508, 513, 515
See application file for complete search history.

(56) References Cited

U.S. PATENT DOCUMENTS

| | | | | | |
|---|---|---|---|---|---|
| 2,215,157 | A | * | 9/1940 | Platzner | 60/527 |
| 4,075,845 | A | * | 2/1978 | Allen | 60/527 |
| 4,166,363 | A | * | 9/1979 | Mougin | 60/641.6 |
| 4,186,558 | A | * | 2/1980 | Kuo | 60/527 |
| 4,295,333 | A | * | 10/1981 | Camirand et al. | 60/641.6 |
| 4,347,703 | A | * | 9/1982 | Lukasavage | 60/641.6 |
| 5,829,255 | A | * | 11/1998 | Sitnyakovsky et al. | 60/688 |
| 6,332,318 | B1 | * | 12/2001 | Thorn | 60/512 |
| 6,438,957 | B1 | * | 8/2002 | Goldman | 60/641.8 |

* cited by examiner

*Primary Examiner* — Hoang Nguyen

(57) ABSTRACT

The system to generate power by freeze expansion pressure powered generator and method for tapping the energy of cold weather from the environment, comprising of flexible water chambers that enable motion for the rotor shaft, gears enabling transformation of linear motion to shaft rotation, and power generator coupling achieving the generation of electricity. The inner part of flexible water chamber is fitted with an immersed heating coil to de-freeze water, so that it can be subjected to freezing and exertion of pressure to rotate the shaft continuously. Freezing of water in flexible chamber is achieved by exposing portion of chamber to atmospheric cold. The turbine rotor speed, temperature, water chamber pressure, and atmospheric pressure are monitored by sensors to ensure overall system safety and performance.

4 Claims, 4 Drawing Sheets

Overall system with fixed Block One-sided Slide Motion flexible water chamber

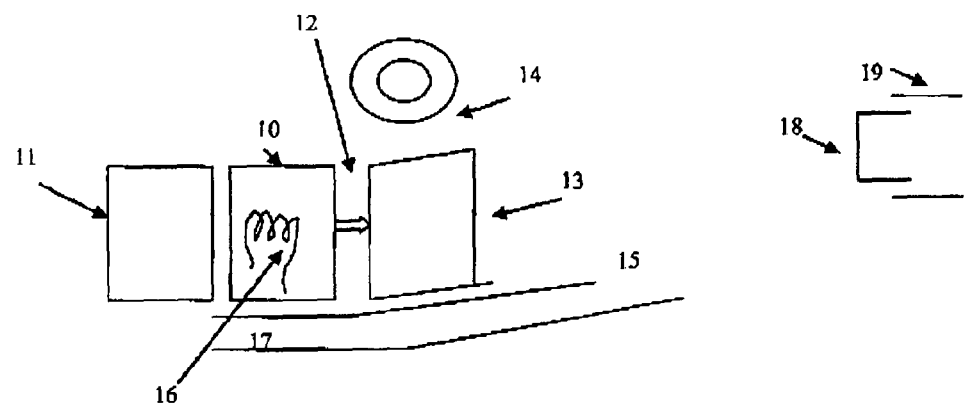
Fig 1: Overall system with fixed Block One-sided Slide Motion flexible water chamber

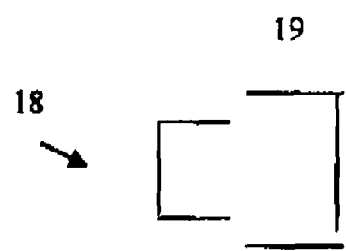
Fig. 2: Flexible water chamber: Simple Configuration

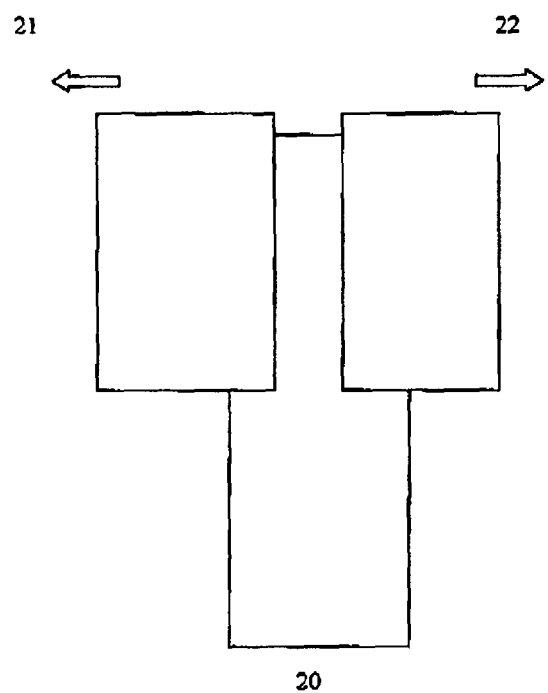
Fig. 3: Flexible water chamber with elongated inner and split outer slides

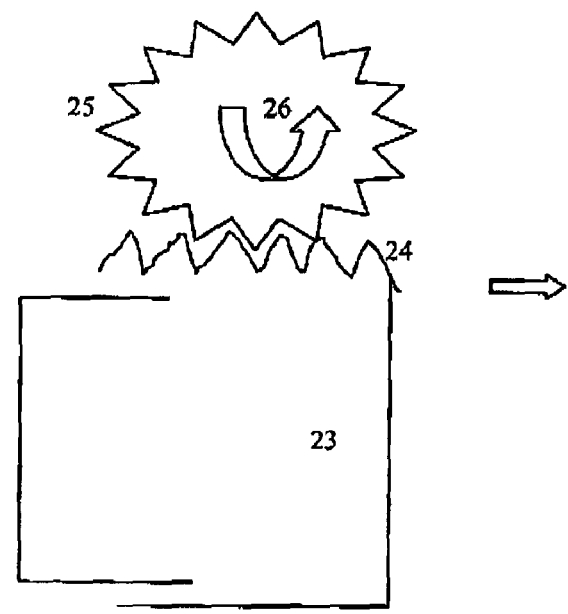
Fig. 4: Flexible Water Chamber with Toothed Outer Slide

SYSTEM AND METHOD TO GENERATE ENVIRONMENT-FRIENDLY POWER BY TAPPING ATMOSPHERIC COLD

This is the formal patent application for Disclosure Document, deposited with USPTO vide Number 549449 dated Mar. 22, 2004.

This invention describes a system and method to tap atmospheric cold for power generation. The main components of this system are Freeze Expansion Pressure Turbine, Flexible water chambers, power generator, and the associated mechanism that transforms motion caused by water expansion upon freezing to enable turbine shaft rotation.

The system functions as below:
(1) The flexible water chambers are exposed to atmospheric cold. The water freezes, when the chamber is exposed to cold, and exerts a pressure. The pressure exerted by water pushes the flexible chamber slides to one or both sides, as per the chamber mounting configuration.
(2) The chamber slide moves a tension spring, or alternately, a weight, and the teeth at top of the sliding weight or water chamber slide impart motion to the turbine shaft through a gear coupling. The gear coupling is such arranged that turbine shaft moves only in one direction, and the gear is disengaged to allow return of the sliding weight and/or chamber slide to pre-freezing position when ice in the flexible chamber melts.
(3) In case of tension spring mounting configuration, the flexible chamber slide pulls the spring upon freezing. The pull in spring loads it with tension that is used to rotate the turbine shaft, or can alternately be used by another mechanism to generate and/or store power. The tension spring, upon release and return, also pushes back the flexible water chamber slide to its original position, when ice in the flexible chamber is melts, thus causing decrease in chamber volume to allow slide return.
(4) In case of platform mounting configuration, multiple chambers in rows are used to impart motion to a heavy-duty turbine shaft at multiple points.
(5) Successive flexible chamber freezing by exposure to atmospheric cold, and subsequent de-freezing by immersion rod heat transfer, make a continuous motion source to rotate the turbine shaft so that the generator coupled to the shaft is in a position to generate power.

Freezing Expansion Pressure Powered Turbine:
(1) We see cans burst in the freezer and rocks split in winter. Given the cold regions throughout the northern USA, Canada, Siberia, and other parts of the world having a potential of unlimited chill, the atmospheric cold can be used to locally generate power by this unique method of tapping the nature's resource. The water needs to be warmed, after it has exerted the expansion pressure on freezing, just to a point where it is in a semi-frozen state and ready to be chilled again by atmospheric cold, and exert the freezing expansion pressure yet another time. The cycle continues unabated, with some of the power-generated fed to water warming mechanism and tapping the rest for local use or feeding the grid.
(2) The mechanism works with flexible water chambers exposed to atmospheric cold conditions to come to a point of freezing, when the water expanding upon freezing pushes the chamber. In a typical configuration, the flexible chamber so pushed sets in motion the blocking weight, on side of the chamber, with a great force. The linear motion of these blocking weights is transformed to a rotary mechanism by use of gears. The rotation pushes the turbine shaft forward. The chamber is now subjected to immersed heating coils to de-freeze the water, so that it can again be used to push the weights upon freezing. The weight can come back to original position owing to the slight incline that allows margin for just enough gravity to slide back. As the weight is pushed, the inclined plane movement is transformed to rotary motion of the shaft through gear arrangement. A bearing enables weight return through inclined plane rail, without the need to reverse rotor shaft. That way, the rotor shaft is imparted motion only in one direction and can keep moving.
(3) There can be alternative configurations for arranging the mounting of flexible water chambers. Also, there can be alternative arrangements to transform flexible chamber movement to turbine shaft rotation, like gears or tension springs. A fixed block mounting will allow chamber movement in only one direction. Non-fixed block mounting will allow chamber movement in both directions. In another mounting configuration, a static platform exposed to cold weather can hold these flexible water chambers in a row, and the turbine shaft can be rotated by coupling multiple chamber rows at various tap points, thus imparting greater force and motion to the turbine. The fixed platform mounting configuration can be suitable for heavy-duty power generation plants, as multiple chambers would impart greater force to rotate a heavy-duty turbine. A typical system configuration is shown in FIG. 1.

The flexible water chamber:
(1) The flexible water chamber is a slide and fit container that adjusts to the volume and is extended on the side/s when water exerts pressure upon freezing. A representative flexible water chamber and one of the typical mounting configurations is depicted in FIG. 1.
(2) In the typical configuration shown in FIG. 1, one side of this container remains fixed against a permanently fixed block, and the other side is pushed forward, sliding a weight in motion or directly imparting its momentum to a gear movement. This arrangement limits the movement of flexible water chamber to only one side. In such placement, the movement of flexible water chamber pushes the moving weight block on an inclined rail, and the moving weight block imparts motion to a gear that rotates the shaft.
(3) In case of directly imparting momentum to the gear, the outer slide of flexible water chamber is toothed at the top surface, so that the teeth of outer slide fit upon engagement to turbine shaft motion imparting gears.
(4) In a variation of the flexible chamber weight slide, a tension spring is attached to the outer slide. The pressure exerted by freezing water is imparted to pull the tension spring, and in-turn the tension in spring rotates the shaft. In this variation, coupling turbine shaft directly to the flexible chambers is eliminated.
(5) Another alternative placement configuration for flexible water chambers is an arrangement with moving weight block and inclined rail at both ends. This arrangement enables the movement of flexible water chamber in both directions: inner part on one side, and the outer part on the other side. A variation of this configuration can have split outer chamber slides to facilitate movement on both sides, as shown in FIG. 4. The movement of flexible water chamber pushes the weight on the inclined rail, and the weight imparts motion to a gear that rotates the shaft. In this configuration, suitable gear arrangement allows the transformation of chamber slide motion from either side as unidirectional rotation of the shaft. Split chamber arrangement can allow a greater effective area of inner chamber for cold exposition.

(6) For heavy-duty power generation applications, placement configuration for flexible water chambers can be a platform holding rows of flexible water chambers. Multiple springs are pulled by the rows of flexible chambers, and released back upon de-freezing, also bringing back the flexible chamber slides to original (pre-slide) positions upon water de-freezing. Alternately, multiple weight slides can replace the tension spring arrangement. Each chamber imparts motion to the freeze expansion pressure powered turbine rotor shaft upon freezing.

Cold Exposition System:

(1) The cold exposition to freeze water is achieved by exposing a portion of the flexible water chambers to atmospheric cold. The relevant moving part of flexible water chambers close to rotor shaft of the freeze expansion pressure powered turbine can be housed in turbine enclosure, as needed.

(2) Using only partial energy generated by this system for heating the water to de-freeze, this can be a suitable mechanism to generate power from the nature's cold in US mid-west and northern areas, Canada, Greenland, Siberia, Mongolia, Sweden, Russia, China, Finland, Alaska, and several other places besides Antarctic and the Arctic region.

(3) When implemented for power generation, it can be a 100% environment friendly alternative with zero emission to contemporary ways of power generation by nuclear and thermal means that pollute the environment. This mechanism can be highly effective, cheap, and is absolutely clean. It neither depletes the nature's resources by burning any fossil fuels and nor does it produce any emissions.

(4) This is just one of the ways by which we can save the environment. Several initiatives to generate power by tapping the locally available natural resources can be combined to achieve the net effect of 'environmental restoration.'

Environment Restoration Algorithm:

(1) To ascertain the impact of a specific pollutant, consider a population size of 100 people who require x units of energy for meet their daily living and working needs. Given that the environment-friendly power generation systems that do not create any poisonous gases or radioactive waste to generate x units of power produce $y1$ amount of Carbon Dioxide in the process of generation. The human respiration process produces $y2$ amount of Carbon Dioxide. The amount of existing green cover converts $y3$ amount of Carbon Dioxide to Oxygen using the photosynthesis process. If $y3>(y1+y2)$, additional green cover may not be required.

(2) However, if $y3<(y1+y2)$, additional green cover would be required to compensate for the fall-short in conversion process. Since the global wind currents quickly disseminate the impact of any local environment degradation or improvement, the benefits of sacrifice in comfort and effort spent at self-sufficiency in need based power generation and usage would be hard to sustain for any community. Finally, a revolution arising out of a global concern for the environment would lead to voluntary replication of such power generation models with innovative modification suited to local needs. The suited approach may integrate such alternatives as supplemental to existing and evolving power systems.

(3) Net Carbon Dioxide Environmental Impact=$\Sigma((y3-(y1+y2)+z)$ for all geographic areas under consideration, where z is the pollution from conventional power source, as apportioned.

This invention is expected to transform the attitude of a global society towards how we generate and use power. In the new paradigm, the levels of prosperity of a nation or community would not be measured by the levels of power consumption, but by new standards of 'how much' did they contribute to restoration (or repair) of the global environment. This attitudinal shift has now become a necessity in view of the current health of our planet. Right from shifting a row of regular low-efficiency bulbs over the mirror in bathroom to a new single high-lumen low wattage lamp and retiring all vegetable peels to a biomass pit in the backyard, small efforts can go a big way in solving the global power and environment problems. Effective ways at power generation, efficient appliances, avoidance of wastage, point of requirement generation for local usage, minimization of losses and a different life style are all but different steps that collectively contribute to a solution. Reaching out to the world, this research project would bring education for masses to cultivate a higher level of responsibility towards the environment.

Specific geographical areas in United States have varying natural potentials and population distribution. For instance, in Alaska, given the enormous potential of the cold, possibility of making a turbine generator powered by freezing pressure of expansion can be evaluated. For each specific region of United States, this evaluation can involve study of the nature's potential, population distribution, and infrastructure suitability for installation of such new technology alternatives.

Since global air currents quickly carry the pollution across national boundaries and oceans, the impact of this invention is likely to be a trendsetter for further research and development in power generation and usage with a paradigm shift in attitude. This shift is a change from hitherto solutions that have focused on minimizing the damage to the new wave focused on restoration of the environment with a net positive impact.

Background of the Invention:

(1) Field of Invention: Environment-friendly power generation by tapping the nature's resource.

(2) Present Invention relates to a system and method for tapping the energy of atmospheric cold to generate power.

Background Art:

(1) A number of inventions exist to tap the natural resources like water and air. Wind turbines capture the energy of blowing wind. Hydropower generation has been pioneered with a variety of turbine systems. Solar energy is also being tapped by solar cells. Recent endeavor to achieve power generation by tapping the gravitational energy is appreciable (U.S. Pat. No. 6,981,376 dated Jan. 3, 2006). Efforts are also underway to tap natural resources in combination with other untapped energy sources that are normally wasted (U.S. Pat. No. 6,981,377, dated Jan. 3, 2006). Similar efforts need to be extended to cover other natural resources like atmospheric cold.

(2) Lukasavage (U.S. Pat. No. 4,347,703, dated Sep. 7, 1982) uses Rankine cycle with evaporator, and condenser. Ice bed is used as an insulation to isolate the hot and cold sources.

(3) Mougin (U.S. Pat. No. 4,166,363, dated Sep. 4, 1979) uses steam and water as fluids in Rankine cycle. Ice bed is used only as a cold source, similarly to Lukasavage's invention, and "thermosiphon" mechanism to channel water, and more specifically focuses on using sea water as the hot source and iceberg with a hollowed pool as the cold source in Rankine cycle.
(4) Goldman (U.S. Pat. No. 6,438,957 B1 dated Aug. 27, 2002) focuses on utilizing waste materials such as automobile tires to aid the collection of solar energy, and employs piezoelectric power generating arrangement.
(5) Sitnyakovsky (U.S. Pat. No. 5,829,255 dated Nov. 3, 1998) focuses on utilizing outside snow and ice in a condenser. Ice is crushed by a grinder to aid the condenser.
(6) Camirand (U.S. Pat. No. 4,295,333 dated Oct. 20, 1981) describes a mechanism similar to the one explained by Lukasavage, except that Camirand uses warm surface sea water to vaporize the liquid to generate mechanical energy.
(7) There is no invention in the area of tapping potential of atmospheric cold by way of utilizing freeze pressure to generate power. Given the vast geographical areas that have extremely cold climate, this invention is likely to help human society to restore the damaged environment by generating environment-friendly power.
(8) Patents referenced:
U.S. Pat. No. 6,981,376 dated Jan. 3, 2006
U.S. Pat. No. 6,981,377, dated Jan. 3, 2006
U.S. Pat. No. 4,347,703, dated Sep. 7, 1982
U.S. Pat. No. 4,166,363, dated Sep. 4, 1979
U.S. Pat. No. 6,438,957 B1 dated Aug. 27, 2002
U.S. Pat. No. 5,829,255 dated Nov. 3, 1998
U.S. Pat. No. 4,295,333 dated Oct. 20, 1981

SUMMARY OF THE INVENTION (1) The present invention describes a system and method for an apparatus to generate environment-friendly electricity by utilization of the potential of cold weather.
(2) The atmospheric cold is utilized to freeze the water and thereby tap the pressure exerted by water upon freezing.
(3) The system for power generation uses a freeze expansion pressure powered turbine and supporting devices for tapping the energy of cold weather from the environment, and associated methods to achieve the power generation functionality.
(4) The freeze expansion pressure powered turbine system comprises of flexible water chambers that impart motion to a rotor shaft, and are exposed to cold environment.
(5) The gears enable transformation of linear motion to shaft rotation, and associated power generator coupling achieves the generation of electricity. An alternate to gear arrangement is tension-spring mounting.
(6) The flexible water chambers can be mounted in alternative configurations. The inner part of flexible water chamber is fitted with an immersed heating coil to de-freeze water, so that it can be repeatedly subjected to freezing and exertion of pressure to rotate the turbine.
(7) Freezing of water in the flexible water chamber happens by exposing a significant portion of the flexible water chamber to atmospheric cold.
(8) The turbine rotor speed, temperature, flexible water chamber pressure, atmospheric pressure, and temperature, are among parameters continually monitored by means of sensors appropriately installed in respective apparatus. This input fed to a processor ensures safety, generates alerts for any abnormal situations, and monitors overall system performance to be within predictable limits.

BRIEF DESCRIPTION OF THE FIGURES ENCLOSED (1) FIG. 1 describes the overall system concept, with all major components. The flexible water chamber shown in this figure is One-sided Slide Motion flexible chamber with a fixed block.
(2) FIG. 2 describes the simple flexible water chamber
(3) FIG. 3 describes the flexible water chamber with elongated inner chamber and split outer slide. The elongated inner chamber is exposed to atmospheric cold to facilitate freezing. The split outer chamber enables sliding in both directions upon freezing.
(4) FIG. 4 describes the toothed outer slide flexible water chamber to show gear rotation.

DESCRIPTION OF THE PREFERRED EMBODIMENT

Referenced Numerals in Drawings

Referring to FIGS. 1 and 2, a flexible water chamber 10 rests on a platform 17 that extends to an inclined rail 15. A fixed block 11 rests on the fixed side of the flexible water chamber 10. The flexible water chamber is exposed to the atmospheric cold. Upon exposing to the cold, the water freezes, exerting pressure upon freezing expansion 12 to a weight 13 that slides on an inclined rail 15. A gear 14 is employed to transform slide motion of the weight on inclined rail to rotate the shaft of a power generator. A water heating element 16 (mounted in the flexible water chamber) is used to melt the frozen ice to enable retracting of the weight on inclined rail to its original position. Upon exposition to the atmospheric cold, the water in flexible chamber 10 freezes again, thus exerting freeze expansion pressure 12 on the weight 13 resting on inclined rail 15 to again move the gear 14 and impart linear motion to rotate the shaft of power generator. The flexible water chamber in a typical configuration consists of an inner slide 18 that rests against the fixed block 11 and outer slide 19 that exerts pressure upon freezing of water to weight 13 on the inclined rail 15.

In an alternate embodiment of the invention, as depicted in FIG. 3, an elongated water chamber 20 has split outer slides 21 and 22 that move in opposite directions upon exerting the pressure of freezing. Gear arrangement enables the application of movement in either direction to enable the rotation of shaft of the power generator in a unilateral direction.

In a typical embodiment of the invention, as depicted in FIG. 4, the outer slide 23 of flexible water chamber is toothed at its top surface 24, enabling its coupling to a gear 25 to enable a circular movement 26 of the gear.

Advantages of the Invention (1) Power generation is an integrated part of human progress and our relationship with nature and environment. An adverse impact on the environment results in extinction of living organism. A number of species that survived are now in danger. The fossil fuels are fast depleting, and their burning causes the emission of harmful gases. Conventional power generation plants consume half of the nation's water supply. In view of the imminent global warming threat, Arctic region is likely to melt, and ocean levels will rise globally, risking lives of millions of inhabitants along the shoreline. More severe hurricanes are likely to result from global warming. There is an urgent need to take action, with focus on generating power with environment-friendly techniques, and restoration of the damaged environment. This invention addresses such environmental issues.

(2) The impact of this invention on society is widespread and global. The greenhouse effect and global warming are serious issues facing the human society. This invention will not only help in the protection of environment, but if adapted on a global scale, it even holds the potential to benefit society in environmental restoration. Lot of damage has been caused to global environment in the name of industrialization, over the past hundred years. Some of the damaged environment can be repaired with this invention.

(3) While hydro is a perennial source of energy, there are issues with rehabilitation of populations and wildlife habitat that is permanently damaged by submergence. Fossil fuels are depleting and burning these to produce power makes greenhouse gases. Nuclear waste disposal is not only a major concern from environmental hazard consideration as material remains radioactive for a million years, the storage sites are potential for a major terrorist strike to unleash havoc. Time has now come to apply the technology to research and develop alternatives to conventional means of generating and using power and study the impact of these alternatives on human society and environment of our planet. While a harsh realization of the environmental threat holds the potential to bring people across the globe to a common platform of agreement, it is not only the effective use of technology to generate power but also the ways we use and waste power and water that need consideration. This invention is an application of technology for benefit of humanity and restoration of the damaged environment.

(4) Affordable energy is needed to power homes, offices, factories, vehicles, appliances, and gadgets. Technically speaking, everything runs on power. This invention will help human society to generate environment-friendly power by tapping atmospheric cold in a cost-effective manner. It would also enable us to think further in the direction of using nature's resources in an environment-friendly manner for benefit of human society in a manner that does not adversely affect the wildlife and their natural habitats.

What is claimed is:

1. A system to generate power by tapping the atmospheric cold to freeze water and utilize pressure exerted by freezing water for power generation comprising:
   a) a flexible fluid holding chamber comprises an inner slide, an outer slide to contain water inside, wherein said inner and outer slides move upon the exertion of pressure by freezing the water when exposed to the atmospheric cold,
   b) at least one slidable weight located next to said flexible fluid holding chamber and being movable by said flexible fluid holding chamber;
   c) a rotary shaft;
   d) gears for transformation of linear movement of said weight to rotate said rotary shaft;
   e) a fixed block at one end of said flexible holding chamber to limit the movement of said flexible holding chamber to only one side;
   f) an inclined rail, wherein the movement of said flexible holding chamber to said only one side pushes the weight up the inclined rail and rotate said rotary shaft through said gears;
   g) an immersed heating apparatus located inside the inner slide of said flexible chamber for de-freezing said water to return the flexible chamber and the weight to the original position.

2. The system in accordance with claim 1, wherein said immersed heating apparatus comprises immersed heating rods, and the weight sliding back to the original position on said inclined rail when said immersion rods heat the water to melt condition causing decrease in volume of liquid inside the flexible chamber.

3. A system to generate power by tapping the atmospheric cold to freeze water and utilize pressure exerted by freezing water for power generation comprising:
   a) a flexible fluid holding chamber comprises an inner slide, an outer slide to contain water inside, wherein said inner and outer slides move upon the exertion of pressure by freezing the water when exposed to the atmospheric cold,
   b) two slidable weights located on both sides next to said flexible fluid holding chamber and being movable by said flexible fluid holding chamber;
   c) a rotary shaft;
   d) gears for transformation of linear movement of said weights to rotate said rotary shaft;
   e) an immersed heating apparatus for de-freezing said water to return the flexible chamber and the weight to the original position;
   f) two inclined rails located on both sides of said weights, wherein the movement of said flexible holding chamber from both sides pushes the weights up the inclined rails and rotate said rotary shaft through said gears;
   g) an immersed heating apparatus located inside the inner slide of said flexible chamber for de-freezing said water to return the flexible chamber and the weights to the original position.

4. The system according to claim 3, wherein said flexible holding chambers comprises two outer slides forming two split outer chambers to move said weights in both directions, the weights imparting motion to said gears to rotate said shaft while enabling the transformation of motion at both ends to unidirectional motion of said shaft.

* * * * *